US008246717B1

(12) United States Patent
Smith et al.

(10) Patent No.: US 8,246,717 B1
(45) Date of Patent: Aug. 21, 2012

(54) PROCESS FOR THE RECOVERY OF METALS FROM USED NICKEL/METAL HYDRIDE BATTERIES

(75) Inventors: W. Novis Smith, Philadelphia, PA (US); Scott Swoffer, New Castle, DE (US)

(73) Assignee: Toxco, Inc., Anaheim, CA (US)

( * ) Notice: Subject to any disclaimer, the term of this patent is extended or adjusted under 35 U.S.C. 154(b) by 268 days.

(21) Appl. No.: 12/806,877

(22) Filed: Aug. 23, 2010

(51) Int. Cl.
*C22B 9/00* (2006.01)
*C01F 17/00* (2006.01)
(52) U.S. Cl. ............... 75/711; 423/21.1; 429/70
(58) Field of Classification Search ............... 75/103, 75/300, 711; 423/21.1; 429/49
See application file for complete search history.

(56) References Cited

U.S. PATENT DOCUMENTS

| | | | | |
|---|---|---|---|---|
| 3,618,866 A | * | 11/1971 | Robinson ............... | 241/101.5 |
| 5,108,585 A | * | 4/1992 | von Rybinski et al. ..... | 209/166 |
| 5,377,920 A | * | 1/1995 | Alavi et al. ............... | 241/17 |
| 6,110,433 A | * | 8/2000 | Kleinsorgen et al. ....... | 423/21.1 |

OTHER PUBLICATIONS

NPL-1: Jungst, Recycling of electric vehicle batteries, in book Pistoia et al edited, Used battery collection and recycling, Elsevier Science (2001), pp. 295-327.*

* cited by examiner

*Primary Examiner* — Jie Yang
(74) *Attorney, Agent, or Firm* — John Lezdey

(57) ABSTRACT

The present invention provides a process of recovering $AB_5$ and/or $AB_2$ as well as other metals from spent nickel metal hydride batteries from a slury by a series of separation steps utilizing the screening off of larger metal particles, removal of magnetizable small metal particles from a filter and then separating $AB_5$ and/or $AB_2$ by passing the filtrate through a froth flotation step to separate $AB_5$ and/or $AB_2$ from lighter small particles.

14 Claims, 1 Drawing Sheet

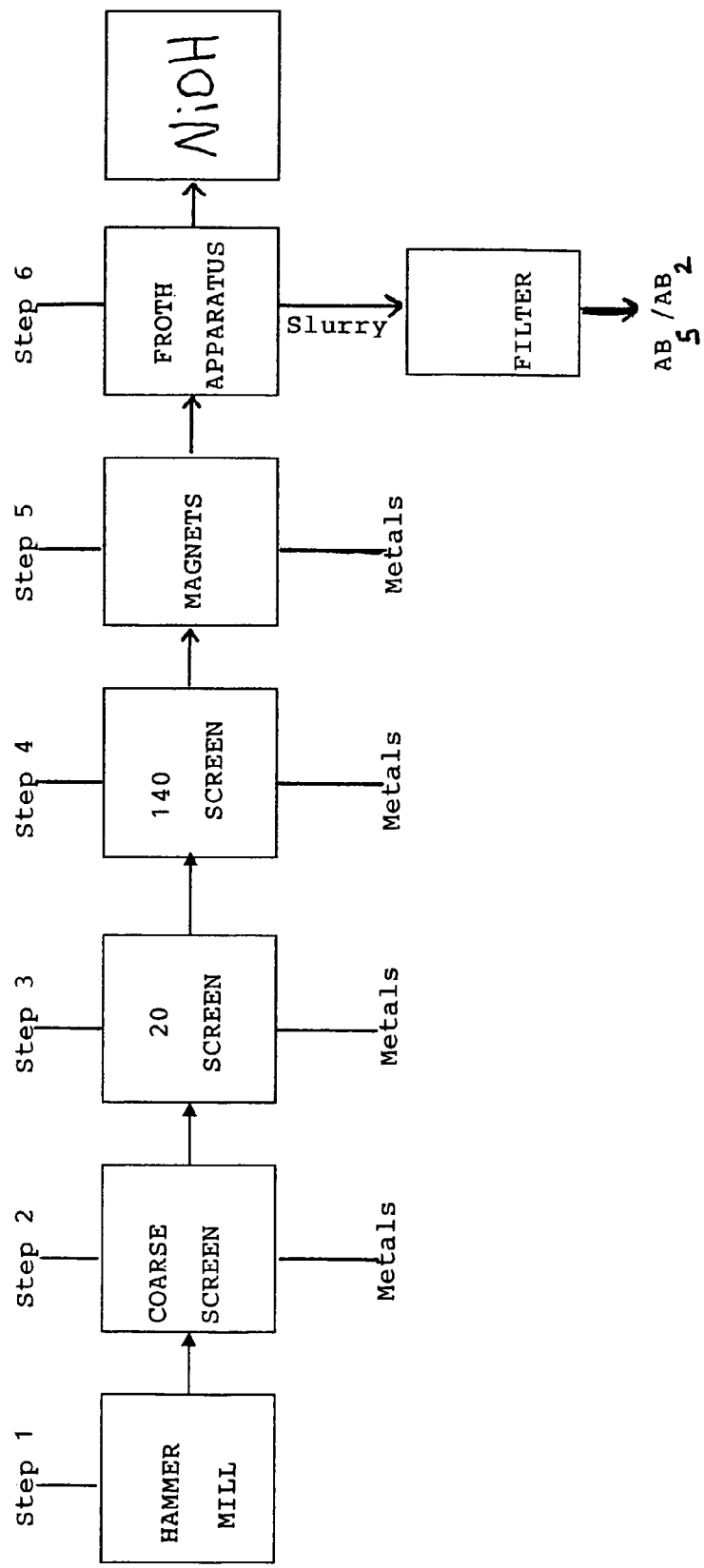

PROCESS FOR THE RECOVERY OF METALS FROM USED NICKEL/METAL HYDRIDE BATTERIES

FIELD OF THE INVENTION

The present invention relates to the process of recovering metals and metal compounds from spent nickel/metal hydride (NiMH) storage batteries. More particularly, there is provided a process for recovery of scrap metals and the final recovery of $AB_5$ and/or $AB_2$.

DESCRIPTION OF THE RELATED ART

Nickel/metal hydride storage batteries are electrochemical energy stores which, compared with other storage batteries such as, for example, the lead storage battery or the nickel/cadmium storage battery, have a higher storage capacity. These storage systems are therefore increasingly widespread not only for the main independent supply of energy to appliances in entertainment electronics, toys and the like, for example in the form of button cells, but also in vehicle drives in large-size battery casings.

The gastight casing, formed from sheet steel, of nickel/metal hydride storage batteries accommodates one or more positive electrodes, one or more negative electrodes and separators, seals and electrolyte.

A positive electrode is conventionally composed of a support and the active cathode mass. Depending on electrode type, gauzes, expanded metal, perforated metal sheet, non-woven fabric or highly porous metal foams are common as supports. The support material is nickel or nickel-plated iron. The active mass is a mixture of nickel hydroxide and cobalt oxide and, possibly, cobalt. In addition to binders and conducting agents, the mixture may contain further metals, including zinc, as hydroxides in lesser amounts.

A negative electrode is likewise composed of support and active anode mass. In this case, the latter is a hydrogen-storage alloy. Hydrogen-storage alloys are intermetallic compounds which can be assigned to a $AB_5$ type on the basis of the simple starting alloy $LaNi_5$ or to an $AB_2$ type in accordance with the simple alloy $TiNi_2$.

Hydrogen-storage alloys of the $AB_5$ type for nickel/metal hydride storage batteries are conventionally composed of 45-55% Ni, 30-35% rare carths (Res), 5-15% Co, 2-5% Mn and 1-4% Al.

The valuable content substances of said storage batteries make their recovery from waste batteries a particularly urgent requirement.

Many processes are already known for processing used storage batteries, directed in particular at the acidic lead storage batteries. Of these, the processing methods for lead/acid storage batteries are of little interest here because they are remote from the subject of the invention.

U.S. Pat. No. 5,858,061 to Kleinsorgen et al, which is herein incorporated by references uses a liquid/liquid extraction and pH of the digestion solution of NIMH batteries in such a way that metal nickel and cobalt are dissolved in an aqueous phase.

The invention is more preferably used in a cell containing a negative electrode having hydrogen storage alloy materials of the so-called $AB_5$-type, a common example of which is described in the basic formula $M_sNiAl_xMn_4CO_3$ and $M_sNi_5(Al_xMn_4Co_3)_x$ wherein $M_s$ represents a lanthanum-rich mischmetal, which includes various rare earth metals and wherein $2.5 \leq r \leq 5.0$, $0 \leq s \leq 2.5$, $0 \leq t \leq 0.5$, and $0 \leq u \leq 0.5$. Hydrogen absorbing alloys of this class (i.e., $AB_5$) are disclosed, for instance, in U.S. Pat. Nos. 4,216,274 (Bruning et al) and 4,375,257 (Bruning, et al).

Typical alloys for the negative counterpart electrode include the so-called $AB_2$-type as disclosed, for instance, in U.S. Pat. Nos. 4,431,561 (Ovshinsky, et al) and 4,716,088 (Reichman, et al). The typical $AB_2$-type materials, as currently envisioned, are based on $TiNi_2$ and typically have the basic atomic structure Ni—Ti—V—Cr—Zr—X—Y wherein X and Y can be other elements of various selection. The invention is more preferably used in a cell containing a negative electrode having hydrogen storage alloy materials of the so-called $AB_5$-type, a common example of which are described in the basic formula $MmNi_rCO_sMn_tAl_u$, wherein Mm represents a lanthanum-rich mischmetal, which includes various rare earth metals, and wherein $2.5 \leq r \leq 5.0$, $0 \leq s \leq 2.5$, $0 \leq t \leq 0.5$, and $0 \leq u \leq 0.5$ and $M_sNiAl_xMn_4CO_3$. Hydrogen absorbing alloys of this class (i.e. $AB_5$) are disclosed, for instance, in U.S. Pat. Nos. 4,216,274 (Bruning, et al) and 4,375,257 (Bruning, et al).

Also a combination of $AB_5$ and $AB_2$ have been utilized in forming the negative electrode.

Negative electrode alloys used in NiMH batteries typically comprise La, Pr and Nd as rare earth elements and Zn, Mg and Ni. Cobalt, manganese and aluminum are common additives.

The components of the NiMH battery include nickel metal grid, $Ni(OH)_2$, nickel coated iron, potassium hydroxide electrolyte, and most importantly a nickel metal alloy powder of up to 25-30% by weight. This alloy powder has been developed to absorb considerable hydrogen and is the source of the descriptor "nickel metal hydride" battery. Under charging conditions this nickel alloy absorbs significant amounts of hydrogen as the metal hydride is formed electrochemically. Under battery discharge conditions this absorbed hydrogen reacts electrochemically back to hydroxide and water providing the electrical current of the battery. The currently most well known nickel alloy used is termed $AB_5$ which is an alloy consisting of one part lanthanum to five parts nickel on a mole basis—theoretically 32.1% lanthanum on a weight basis. However, as a practical matter other rare earth metals can be substituted for lanthanum. Therefore the naturally occurring rare earth oxide mixture is used to form the misch metal which avoids the expense of separating the rare earth oxides into the individual elements before reducing them to the mixed metal and not to the pure metal such as pure lanthanum metal. This metal mixture is used which is called misch metal. Therefore the $AB_5$ and/or $AB_2$ alloy is an alloy of a mixture of lanthanum group metals and nickel with some cobalt and other metals added in small amounts for optimized hydrogen formation and storage. This $AB_5$ component is the most expensive raw material cost for this battery. In addition the applications for the different rare earth oxides (lanthanum group oxides/metals) is growing for use in permanent magnets for high energy density motors, dopants and a host of other applications while at the same time the production of these materials is limited and tightly controlled from China. In other words these materials are in a long term critical situation.

The recovery and recycling of the nickel and the rare earths from these used NiMH batteries is highly desirable and is being practiced by several variations of a pyrolysis process. One method is to throw the batteries into a roasting furnace with other iron scrap and obtain a higher nickel steel with the rare earth component being lost into the slag. Another method is to roast the batteries in a furnace up to 800-900° C. under reducing conditions to minimize the oxidation of nickel but the rare earth metals are still lost in the slag.

SUMMARY OF THE INVENTION

The present invention relates to the separation and separate recovery of nickel hydroxide, nickel coated iron and battery ready $AB_5$ and/or $AB_2$.

Accordingly, the process of the invention comprises the steps of:
1) reducing the size of NiMH batteries under a water spray to produce a slurry;
2) screening the solids through at least one screen to remove plastic and separation of large pieces;
3) screening the filtrate from step 2) through at least one screen which is +20 mesh to remove nickel metal and nickel plated steel;
4) screening the filtrate from step 3) through a 140 mesh screen and −20 mesh screen to recover nickel alloys;
5) passing the filtrate from part 4) through a magnetic stripping device to recover any nickel and iron metal;
6) passing the filtrate from part 5) into a froth or foam flotation device whereby the froth contains residual light matter and the dense $AB_5$ and/or $AB_2$ metallic powder sinks to the bottom; and then
7) recovering the $AB_5$ and/or $AB_2$ powder from the resulting filtrate.

Advantageously, nickel hydroxide, cobalt hydroxide and other additives that are present are recovered from the froth.

It is a general object of the invention to recover $AB_5$ and/or $AB_2$ from spent nickel metal hydride (NiMH) batteries.

It is a further object of the invention to recover any rare earth oxides/metal from spent NiMH batteries.

It is another object of the invention to utilize the $AB_5$ and/or $AB_2$ and the rare earth oxides/metals in new NiMH batteries.

Other objects and advantages of the present invention will become apparent from a reading of the preferred embodiments and the drawing.

BRIEF DESCRIPTION OF THE DRAWING

FIG. 1 is a flow chart of the present process.

DESCRIPTION OF THE PREFERRED EMBODIMENTS

According to the invention, NiMH batteries ae treated in step 1) of the invention by passing them into a hammer-mill under a water spray to reduce the batteries into small pieces, dislodge any $AB_5$ and/or $AB_2$ and nickel hydroxide from the electrodes and emerge as a wet slurry mixture which is passed onto a shaker or oscillating apparatus with at least one screen to remove the coarse plastic components and coarse metal. The final screen being +20 mesh screen. A +20 mesh fraction is composed of nickel plated steel and nickel metal with less than 1% $AB_5$ and $AB_2$ alloy powder and is recovered from high nickel steel scrap. The resulting −20 mesh slurry is then treated in step 4) by passing through a +140 mesh screen to further remove nickel metal and any iron containing material. The +140 mesh and −20 mesh fraction is recovered for use in high nickel alloy with over 60% nickel. The −140 mesh slurry is then treated in step 5) by passing through a magnetic stripping apparatus to remove any traces of nickel and iron metal. The demagnetized slurry is then treated in step 6) by passing into a froth or foam flotation apparatus whereby the lighter weight nickel hydroxide mixture is floated off from the dense $AB_5$ and/or $AB_2$ metallic $AB_5$ and/or $AB_2$ powder which sinks to the bottom.

The froth can be formed using common anionic or non-ionic surfactants wherein air is bubbled into the slurry. Commonly used are isobutyl carbinol and hydroxy propyl Cellulose. Froth or foam flotation is well known in the art. Optionally, a magnetic device can be placed in the flotation cells to remove any very fine magnetic particles that may have passed through the initial magnetic removal step.

The froth can be floated off and filtered. Optionally, the filtered residue is washed and then dried.

The heavier slurry with metallic $AB_5$ and/or $AB_2$ powder from process are filtered and the residue washed with water (optionally with dilute acid) and then dried. The recovered solids also comprise the lanthanum group and rare earth metals of the original battery.

The preferred steps of the process to recover $AB_5$ which is present begins with the use of the following steps:
1) The spent batteries are reduced to small particles with a hammer mill under an aqueous spray to produce a slurry. (Optionally an inert atmosphere with nitrogen can be used at this point.)
2) The slurry from 1) is screened through a coarse mesh to remove any large particles and plastic material. Preferably a plurality of different coarse meshes are utilized to isolate different large sized particles.
3) The filtrate from 2) is passed through at least one screen of 20 mesh or coarser to remove metal such as nickel and nickel plated steel.
4) Screening the filtrate from 3) through a suitable screen, for example a 140 mesh screen to recover a high nickel metal containing fraction.
5) Passing the filtrate from 4) through a magnetic stripping device to remove any nickel or iron metal particles.
6) Passing the filtrate from 5) into a froth or foam flotation device whererby the froth contains residual light matter and the dense $AB_5$ metallic powder sinks to the bottom, and then
7) Recovering the $AB_5$ powder from the resulting filtrate.

The recovery of the $AB_5$ can be by centrifuging the filtrate of step 7). The $AB_5$ powder and rare earth metals are usually present in the proportion found in the initial battery anode particles used in step 1).

The foregoing description and the illustrative embodiments of the present invention have been described in detail in varying modifications and alternate embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

What is claimed is:

1. A process for the recovery of metals from spent NiMH batteries selected from the group thereof consisting of hydrogen-storage alloy $AB_5$ type, $AB_2$ intermetallic compound and mixtures thereof which comprises the steps of:
A) reducing spent battery pieces to small particles under an aqueous spray to produce a slurry;
B) screening the slurry from step A) through a coarse mesh to remove any large particles and plastic material;
C) screening the filtrate from step B) through at least one screen to remove any nickel, nickel plated steel particles or nickel alloys;

D) passing the filtrate from step C) through a magnetic stripping device to remove metals selected from the group consisting of nickel and iron;
E) passing the filtrate from step D) into a froth or foam flotation device whereby the froth or foam retains residual light matter and the denser metals selected from the group consisting of $AB_5$, $AB_2$ and a mixture thereof sink to the bottom of the filtrate, and then;
F) recovering the metals from the filtrate of step E) whereby the $AB_5$ and $AB_2$ particles are not dissolved in the process and recovered in step F).

2. The process of claim 1 wherein metals selected from the group consisting of nickel, and nickel plated steel are recovered from step C).

3. The process of claim 1 wherein rare earth metals are recovered.

4. The process of claim 1 wherein the froth or foam from step D) is separated from the filtrate, washed and nickel hydroxide and cobalt hydroxide are recovered.

5. The process of claim 1 wherein the spent batteries comprise battery electrode without $AB_2$.

6. The process of claim 1 wherein the spent NiMH batteries have been previously crushed and treated with dilute sulfuric acid wherein $AB_2$ and $AB_5$ are not dissolved.

7. A process for the recovery of hydrogen-storage alloy $AB_5$ type intermetallic compound from spent NiMH batteries comprising the steps of;
a) hammer-milling spent batteries under a water spray to form a slurry with small particles;
b) passing the resulting slurry from a) through a series of mesh screens to remove any large particles;
c) passing the resulting filtrate from step b) through a magnetic stripping apparatus to remove any small magnetizable particle metals;
d) passing the resulting filtrate from step c) into a froth flotation device whereby $AB_5$ sinks to the bottom of the filtrate and the froth contains light non-magnetizable particles, and then
e) recovering $AB_5$ from the filtrate from step d) whereby $AB_5$ particles are not dissolved in the process and recovered in step e).

8. The process of claim 7 wherein a non-ionic surfactant is used in the froth flotation device.

9. The process of claim 7 wherein an anionic surfactant is used in the froth flotation device.

10. The process of claim 7 wherein $AB_5$ particles are recovered from the filtrate of step d) by centrifuging.

11. The process of claim 10 wherein the recovered $AB_5$ particles are washed with dilute acid and dried.

12. The process of claim 7 wherein nickel hydroxide and cobalt hydroxide are recovered from the froth of step d).

13. The process of claim 7 wherein nickel and iron metal particles are recovered from step b).

14. The process of claim 7 wherein rare earth metals are recovered.

* * * * *

UNITED STATES PATENT AND TRADEMARK OFFICE
CERTIFICATE OF CORRECTION

| | |
|---|---|
| PATENT NO. | : 8,246,717 B1 |
| APPLICATION NO. | : 12/806877 |
| DATED | : August 21, 2012 |
| INVENTOR(S) | : W. Novis Smith et al. |

It is certified that error appears in the above-identified patent and that said Letters Patent is hereby corrected as shown below:

In The Specification

At column 1 after the title, please add the following new heading and paragraph:

--STATEMENT REGARDING FEDERAL FUNDING

This invention was made with government support under Contract No. DE-EE0002610 awarded by the Department of Energy. The government has certain rights in the invention.--

Signed and Sealed this
Nineteenth Day of April, 2016

Michelle K. Lee
*Director of the United States Patent and Trademark Office*